United States Patent [19]

DeGooyer

[11] Patent Number: 4,608,405

[45] Date of Patent: Aug. 26, 1986

[54] AQUEOUS BASED EPOXY RESIN CURING AGENTS

[75] Inventor: William J. DeGooyer, Louisville, Ky.

[73] Assignee: Celanese Corporation, New York, N.Y.

[21] Appl. No.: 730,906

[22] Filed: May 6, 1985

[51] Int. Cl.$^4$ ............................................. C08G 63/00
[52] U.S. Cl. ...................................... 523/404; 528/103; 528/111; 564/220; 564/325; 564/348
[58] Field of Search ............... 528/103; 523/404; 564/220, 325, 348

[56] References Cited

U.S. PATENT DOCUMENTS

| | | | |
|---|---|---|---|
| 4,089,826 | 5/1978 | Moss et al. | 260/29.2 EP |
| 4,116,900 | 9/1978 | Belanger | 260/18 EP |
| 4,182,831 | 1/1980 | Hicks | 528/103 |
| 4,197,389 | 4/1980 | Becker et al. | 528/103 |
| 4,225,478 | 9/1980 | Hicks | 260/29.2 TN |
| 4,246,148 | 1/1981 | Shimp et al. | 260/18 EP |
| 4,419,467 | 12/1983 | Wismer et al. | 523/414 |
| 4,420,574 | 12/1983 | Moriarity et al. | 523/404 |
| 4,423,166 | 12/1983 | Moriarity et al. | 523/414 |
| 4,465,722 | 8/1984 | Fiaux et al. | 528/103 X |

*Primary Examiner*—Earl Nielsen
*Attorney, Agent, or Firm*—Herbert P. Price

[57] ABSTRACT

The instant invention is an epoxy resin curing agent based upon an epoxidized polyol containing aromatic and polyalkylene ether moities in which substantially all of the epoxide groups are reacted with a polyamine wherein each primary amine in the resulting reaction product is further reacted with a monoepoxide or a monocarboxylic acid. The resulting epoxy resin curing agent may be used in a water based system for curing epoxide resins. The curing agent is rendered water soluble or water dispersible by salting with a conventional volatile monocarboxylic acid such as acetic, formic or propionic acid.

22 Claims, No Drawings

AQUEOUS BASED EPOXY RESIN CURING AGENTS

BACKGROUND OF INVENTION

1. Field of Invention

This invention relates to epoxide resin curing agents. More particularly, this invention pertains to mixed, epoxy resin based, polyamines which may be used to cure polyepoxides in aqueous systems.

2. Prior Art

Solvent based, epoxy resin curing agent systems have been known for many years. However, these solvent systems often are quite flammable and expensive and many exhibit disagreeable odors.

Moreover, in recent years increasingly strict regulation of environmental pollutants has lead to a limitation on the types and amounts of organic solvents which can be used in epoxy resin curable systems. The first approach to these limitations on the solvent content of coating systems was simply to employ a surfactant and emulsify or disperse existing polymeric systems in water. However, the cured products which resulted from these emulsions or dispersions often exhibited poor properties when compared to prior art solvent-based systems. In particular, the chemical and water resistance of such systems was often lower because of the high levels of surfactant which were needed. Therefore, the search has continued to discover epoxy resin curing agents which may be dispersed in water and which maintain the high performance levels of prior art solvent based curing agents.

U.S. Pat. No. 4,166,900 discloses cathodic electrodeposition resins prepared based upon polyepoxides, polyamines and monoepoxides. While the monoepoxides and polyamines of this patent are similar to the materials employed in this invention, the polyepoxide utilized in the '900 patent is quite different. Specifically in column 3, lines 47 to 68 there is no disclosure of the use of aliphatic, polyether based, polyepoxides in conjunction with the aromatic polyepoxide.

U.S. Pat. No. 4,246,148 discloses an aqueous coating composition based upon an epoxy polyamine adduct end capped with a monoepoxide. In this patent it is made clear that aliphatic polyether polyepoxides were not contemplated. Specifically in column 5, lines 10 to 20, a general formula is shown which clearly discloses an aromatic diepoxide, not an aliphatic polyether polyepoxide as contemplated by the inventor.

Thus it is the object of this invention to prepare epoxy resin curing agents which are useful in aqueous based systems.

It is another object of this invention to prepare water-based epoxy resins curing agents which exhibit properties equivalent to the properties of prior art solvent-based systems.

It is another object of this invention to prepare aqueous-based epoxy resin curing agents which exhibit improved compatibility with known epoxy resins systems.

It is yet another object of this invention to prepare epoxy resin curing agents having improved curing properties.

These and other objectives are obtained by preparing the epoxy resin curing agents of the instant invention.

SUMMARY OF INVENTION

Basically the instant invention involves an ambient temperature curing agent used to cure epoxide resins. The curing agent preferably is prepared by coreacting under liquid advancement conditions, a diglycidyl ether of a dihydricphenol, a diglycidyl ether of an aliphatic dihydroxy polyether and a dihydricphenol to produce a product having an average weight per epoxide (WPE) of about 400 to about 1300. Substantially all of the epoxy groups which remain in the advanced product are then reacted with a polyamine and at least each primary amine group of the polyamine/diepoxide reaction product is further reacted with a monoepoxide or a monocarboxylic acid. These curing agents may be salted with a volatile acid and employed in aqueous systems to provide coatings having superior cured states film properties. While the preparations of these curing agents by the liquid advancement process is preferred, it is also possible to prepare similar curing agents by starting with the corresponding dihydricphenol and aliphatic dihydroxy polyether and epoxidizing this mixture using well known epoxidization techniques.

DETAILED DESCRIPTION OF INVENTION

The base composition of the instant reaction is a mixed aliphatic/aromatic polyether polyol which is essentially linear in structure wherein the end groups of the polyol are epoxidized.

In order to form this mixed copolymer, several reaction schemes may be employed. Preferably an aliphatic dihydroxy polyether and a dihydricphenol are separately epoxidized, generally by reacting the base polyol with an epihalohydrin and dehydrohalogenating under basic conditions. The product which results from these reactions, depending upon the starting material, is either a phenolic based diepoxide or an aliphatic polyether polyol based diepoxide. In general these reactions are carried out under conditions sufficient to form an essentially monomeric, linear diepoxide. The resulting diglycidyl ether of a dihydricphenol and the diglycidyl ether of an aliphatic polyether polyol are then mixed in a reactor and additional dihydric polyol is added. The mixture is then heated under liquid advancement conditions to form a chain extended, mixed aliphatic-/aromatic polyether diepoxide product. This later reaction is catalyzed utilizing catalysts such as triphenylphosphine, ethyltriphenylphosphonium iodide, ethyl triphenylphosphonium acid acetate or the various bases such as potassium hydroxide.

While the preferred reaction involves the liquid advancing of a mixture of the dihydricphenolic based diepoxide and the aliphatic polyether based diepoxide, it is also possible to prepare the diepoxides useful herein by starting with a mixture of the aliphatic polyether and the dihydricphenol and epoxidizing this mixture utilizing added epihalohydrin under conditions well known in the art. To the extent that this later process is utilized, the ratio and formulas set forth in the specifications must be modified to take into account the specific reactants being employed.

The dihydricphenols which are useful herein in both the liquid advance process and as the material from which the epoxidized dihydricphenol is formed, are exemplified by resorcinol, hydroquinone, p,p'-dihydroxydiphenyl propane (Bisphenol A), p,p'-dihydroxydiphenyl ethane, bis(2-hydroxynaphthyl)methane, 1,5-dihydroxynaphthylene and the like with Bisphenol A being preferred.

The aliphatic dihydroxypolyethers which are useful herein include, for example, an addition product of an alkylene oxide or an addition product of an alkylene oxide with a dihydric alcohol. Suitable alkylene oxides are, for example, ethylene oxide, propylene oxide, butylene oxide, pentylene oxide and hetero- or block copolymers of these oxides. Preferably, however, the alkylene oxide is propylene oxide. Suitable polyhydric alcohols are both aliphatic and aromatic alcohols individually or by admixture, such as, for example, ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3 pentandiol, 1,6-hexandiol.

It is preferred that one starting material in carrying out the liquid advancement reaction be the diglycidyl ether of a dihydricphenol. These diglycidyl ethers are in the most preferred instance diglycidyl polyethers of Bisphenol A having an epoxide equivalent weights in the ratio about 180 to about 195 preferably about 186 to about 192.

The other preferred starting material in carrying at the liquid upgrade reaction is a diglycidyl polyalkylene polyether of the $C_1-C_4$ glycols preferably ethylene or propylene or mixed ethylene/propylene glycols (including those products prepared based on the corresponding ethylene or propylene oxides), having a molecular weight in the range of about 150 to about 1500.

The weight ratios of the diglycidyl ether of the dihydricphenol to the diglycidyl ether of the aliphatic polyether polyol employed in the liquid advancement process may vary. Preferably this ratio is in the range of about 0.6–5.0 to 1. Most preferably about 1.25–4.7 to 1 with the best products being obtained at nearer to the 4.7 to 1 reaction ratio.

The aliphatic polyether diepoxide and the dihydricphenolic diepoxide as pointed out above are subject to a liquid advancement reaction by mixing the two products with a dihydricphenol such as bisphenol A the amount of the dihydricphenol which is added depends upon the amount of advancing which is desired. Preferably the end product will have an average weight per epoxide of about 400 to about 1300 preferably about 600–900.

Each site in the resulting polyepoxide which contains an epoxide group is further reacted with a polyamine. The polyamines contain at least two amine nitrogen atoms per molecule, at least three amine hydrogen atoms per molecule, and no other groups which are reactive with epoxide groups. These polyamines can be aliphatic, or cycloaliphatic and contain at least two carbon atoms per molecule. Useful polyamines contain about 2 to about 6 amine nitrogen atoms per molecule, 3 to about 8 amine hydrogen atoms, and 2 to about 20 carbon atoms. Examples of such amines are the polyalkylenepolyamines, ethylene diamine, 1,2-propylene diamine, 1,3-propylene diamine, 1,2-butylene diamine, 1,3-butylene diamine, 1,4-butylene diamine, 1,5-pentylene diamine, 1,6-hexylene diamine, methane diamine, 1,4-diaminocyclohexane, meta-xylylene diamine and the like. Preferred amines for use in this invention are polyamines of the formula:

$$H_2N-R-NH-(R_{\overline{n}})NH_2$$

wherein n is 0 to 4 and R is an an alkylene group containing 2 to 6 carbon atoms. Examples of the alkylene polyamines are ethylene diamine, diethylene triamine, triethylene tetramine, tetraethylene pentamine, pentaethylene hexamine, dipropylene triamine, tributylene tetramine, hexamethylene diamine, dihexamethylene triamine and the like. Mixtures of these amines can also be used. The more preferred amines are the ethylene polyamines with the most preferred being triethylene tetramine and diethylene triamine.

In preparing the epoxy-amine adducts of this invention, the polyepoxide resin and the polyamine are reacted under such conditions that the adduct so formed contains about 1 mole of polyamine for each epoxide group originally present in the polyepoxide resin, i.e., about one mole of polyamine is reacted with each epoxide equivalent of the polyepoxide.

The final component of the instant invention is an end capping agent. The end capping agent should be employed in an amount sufficient to react with substantially all primary amine groups (thereby providing extended pot life) and yield an end capped adduct which is compatible with the epoxy resin which is employed.

It has been found that one type of end capping agent which meets these requirements includes a monoepoxide or mixture of monoepoxides having (a) one 1,2-epoxide group per molecule and no other groups which are reactive with amine groups and (b) between about 9 and about 20, preferably between about 9 and 15, carbon atoms per molecule.

Representative examples of suitable aliphatic monoepoxides for use in the end capping agent include monoepoxidized, terminally unsaturated, straight chain hydrocarbons (also known as terminal olefin oxides) having between about 9 and about 16, preferably between about 11 and about 14 carbon atoms and mixtures thereof, such as decylene oxide, undecylene oxide, dodecylene oxide, tridecylene oxide, tetradecylene oxide, and pentadecylene oxide, monoglycidyl ethers of aliphatic alcohols, said glycidyl ethers having between 6 and 20 carbon atoms, and mixtures thereof, such as butyl glycidyl ether, octyl glycidyl ether, nonyl glycidyl ether, decyl glycidyl ether, and dodecyl glycidyl ether; and monoglycidyl esters of saturated tertiary monocarboxylic acids, said esters having between about 9 and about 16, preferably between about 11 and about 14 carbon atoms, such as the glycidyl ester of versatic acid (i.e., a mixture of 9 to 11 carbon carboxylic acids used to make Cardura E), tert-octanoic acid, tert-nonanoic acid, tert-decanoic acid, tert-undecanoic acid, and tert-dodecanoic acid.

Representative examples of aromatic monoepoxides, i.e., at least one aromatic ring containing compound having attached thereto an epoxy functional group and no other reactive functional groups, include the monoglycidyl ethers of monohydric aromatic alcohols such as phenol and naphthanol, alkyl substituted monoglycidyl ethers of monohydric aromatic alcohols, said alkyl groups having from about 1 to about 4, or higher carbon atoms, such as monoglycidyl ether of p-tert-butyl phenol and o-cresol. The preferred aromatic monoepoxide is o-cresyl glycidyl ether.

Finally, oils containing up to about 24 carbon atoms per molecule and containing an unreacted epoxide group may also be used herein. Examples of such materials include epoxidized cashew nut oil.

Another type of end capping agent which meets the requirements of the instant invention is a monocarboxylic acid. If the carboxylic acid contains unsaturation, the unsaturation must be no closer than 3,4 to the carboxylic acid group and in addition the unsaturated carboxylic acid should contain at least 4 to about 22 carbon atoms per molecule. If the monocarboxylic acid is saturated, it should contain from about 5 to about 11 carbon atoms. Examples of the unsaturated acids include most of the drying oil based fatty acids particularly linseed fatty acid. Monocarboxylic acids include various $C_5$–$C_{11}$ straight chain and branched chain carboxylic acids including preferably pelargonic acid.

The reaction between the polyepoxide, the polyamine and the monoepoxide is not difficult to carry out. Preferably the polyepoxide is reacted with a relatively large excess of the polyamine at temperature of approximately 200° F. to 300° F. It is preferred that the polyepoxide be added to the amine over a period of time-generally about one to four hours. The amount of excess which is employed varies depending upon the reactivity of the various reactants which are chosen. At least about 2 and preferably at least about 3 mols and no more than about 10 mols of amine are employed for each epoxide equivalent present in the polyepoxide. After all of the polyepoxide has been added, the materials are allowed to react at reaction temperature for approximately one to four hours.

The preparation of adducts of polyepoxide resins and polyamines is described in further detail in U.S. Pat. Nos. 4,093,594 and 4,111,900, the disclosures of which are hereby incorporated by reference.

When the adducting reaction is completed, unreacted amine, if any, is removed by vacuum distillation or by steam sparging under vacuum distillation, at temperatures of not greater than about 500° F. If temperatures in excess of 500° F. are employed, the adduct will discolor. The steam sparging is conducted in a manner sufficient to reduce the presence of unreacted amine in the adduct to an amount not greater than about 0.5% by weight, based on the weight of the adduct. If unreacted amine is present in amounts greater than about 0.5%, the pot life of the mixture of the curing agent and the polyepoxide which forms upon mixing the two components described herein will be reduced substantially.

The product which results after the epoxide resin has been reacted with the polyamine is extremely viscous and it is preferred that an oxygenated solent or co-solvent as described hereafter, such as 2-propoxy ethanol, be added to the reaction mixture to reduce its viscosity. In general about 20 to about 50 percent by weight of 2-propoxy ethanol or another oxygenated solvent may be added at this point to control processing viscosity.

When the epoxy-amine adduct formation has been completed and the unreacted amine has been removed, the end capping agent is reacted therewith at a temperature of about 65° C. to about 150° C. for a time sufficient to bring the reaction to completion, typically about 5 minutes to 3 hours. Lower temperatures may be employed at the expense of increasing the reaction time.

The maximum amount of the end capper which can be reacted with the epoxy-amine adduct is influenced by whether a monoepoxide is employed as a diluent for the epoxy resin as described hereinafter. It has been found that if too many of the reactive amine groups of the epoxy-amine adduct are defunctionalized before or during reaction with the epoxy resin, either by reaction with the monoepoxide end capping agent or by eventual reaction with the diluent which can accompany the epoxy resin, then the epoxy resin will not react to the desired extent with the end capped adduct and the cured film will be soft and exhibit poor solvent resistance.

The minimum amount of end capping agent which is reacted with the epoxy-amine adduct is controlled by the improvement in wettability sought to be imparted to the coating composition and the adverse effect on pot life which the presence of primary amines would impart to the coating composition.

The presence of a significant amount of primary amines on the end capped epoxy-amine adduct in an aqueous system reduces the pot life of the system to an unacceptable extent due to their high reactivity and will result in either a rapid viscosity drop or increase depending on the molecular weight of the polyepoxide employed to prepare the epoxy-amine adduct. In addition, primary amine groups in the finished product tend to form amine carbonates producing undesirable amine "sweating". Thus, the amount of end capping agent must at least be sufficient to substantially eliminate the presence of primary amines on the epoxy amine adduct. Generally the maximum amount of the encapping agent should be no more than about 1.2 moles per primary amine group.

After the reaction is completed, the material is reduced in a solvent or co-solvent for the system. In general, the amount of the solvent that is added is not greater than about 45% and is typically about 5 to about 45% by weight based on the weight of the adduct and co-solvent, preferably no greater than about 40%. Examples of this solvent include ethers, alcohols, glycol ethers, ketones and the like. The preferred solvents are the glycol ethers such as the various lower alkyl ethers of ethylene and propylene glycol.

After the above product is prepared, it is salted using a volatile acid and then dissolved in water. The degree of salting of the epoxy amine adduct is herein defined to be the number of equivalents of acid sufficient to react with the total number of amine nitrogen equivalents in the end capped epoxy-amine adduct expressed as a percentage of the total number of amine nitrogen equivalents in the system. Thus, a 15% degree of salting indicates that the end capped epoxy-amine adduct has been reacted with sufficient acid to convert 15% of the amine nitrogens present on the adduct to their corresponding salt.

The particular degree of salting is selected to control, as desired, a number of factors such as cure temperature, cure speed, pot life and dispersability. As the degree of salting increases, the cure time at a fixed temperature increases along with pot life. For industrial maintenance coatings the degree of salting is selected to achieve an ambient temperature curing system and the associated reduction in pot life at the lower degrees of salting is an acceptable trade off.

In general, the end capped epoxy-amine adduct is reacted with sufficient acid to achieve a degree of salting of from about 2% to about 65%, preferably from about 2% to about 20%.

The volatile acid used herein includes both organic and inorganic acids and is defined to be an acid which will substantially completely evaporate at the temperature at which drying and curing occur. The volatile organic acids may be aliphatic, cycloaliphatic, or heterocyclic and may be saturated or unsaturated. Representative examples of volatile organic acids include acetic acid, formic acid, propionic acid, butyric acid, acrylic acid, methacrylic acid, and cyclohexanoic acid. The organic acid will preferably be an aliphatic monocarboxylic acid having up to 4 carbon atoms. Representative examples of volatile inorganic acids include hydrochloric acid, hydrobromic acid, and hydrofluoric acid. The preferred acids are acetic, formic and propionic acids.

The salted, end capped, epoxy-amine adduct, in addition to acting as the principal film forming resin of the cured composition, acts as a surfactant aiding the incorporation of the epoxy resin into the two component blend and the subsequent formation of a very small particle size emulsion.

The solids content of the salted, end capped, epoxy-amine adduct may be reduced, prior to mixing with the second component, by dilution with water. Preferably the reduced solids content is in the range of about 35% to about 55%, by weight.

The second major component of the coating system is a low molecular weight, water dispersible (either alone or in the presence of a co-solvent) epoxy resin having more than one terminal epoxide group. The epoxy resins suitable for use in the second component include the glycidyl polyethers of dihydric phenols as well as epoxy novolac resins. The dihydric phenols employed to prepare the epoxy resins are further described in U.S. Pat. No. 4,246,148. It is particularly preferred to employ those glycidyl polyethers wherein the dihydric phenol is bisphenol-A.

The maximum molecular weight of the epoxy resins is limited by the fact that the amount of epoxy resin employed in the second component is usually selected to achieve stoichiometric equivalence of epoxy groups with the amine hydrogen equivalents of the end capped epoxy-amine adduct. Consequently, as the molecular weight of the epoxy resin increases, thereby increasing the epoxide equivalent weight, more of the epoxy resin is required to satisfy the stoichimeteric requirement. However, the use of large amounts particularly of higher molecular weight epoxy resins is not preferred because it is water insoluble and becomes increasingly more difficult to microemulsify or disperse as the amount thereof is increased.

In view of the above, it is preferred to characterize the epoxy resin also in terms of its epoxide equivalent weight. Thus the epoxide equivalent weight (WPE) of the glycidyl polyethers of dihydric phenols is not greater than about 1000, preferably from about 180 to about 700.

As described above, the amount of epoxy resin which is present in the coating composition is preferably sufficient to achieve substantially stoichiometric equivalence with the reactive amino hydrogens on the end capped epoxy-amine adduct. In general, it is preferred to employ the epoxy resin in an amount sufficient to achieve an epoxy to reactive adduct amine hydrogen equivalent weight ratio of from about 0.5:1.0 to about 1.5:1.0, and, preferably, from about 0.9:1.0 to about 1.1:1.0.

The epoxy resins which are useful herein, may be either liquids or solids. In the case of liquid epoxy resins, such as, for example, the diglycidyl ethers of bisphenol-A, it is possible to prepare a dispersion of the epoxy resin in the curing agent without the need to add a co-solvent or surfactant. In these situations the salted curing agent acts as a surfactant to disperse the liquid epoxy resin. However, where the epoxy resin is solid, even in the presence of a co-solvent, the mere mixing of the epoxy resin curing agent and the epoxy resin often will not result in a permanent dispersion. Particularly as the viscosity of the curing agent increases above about 10,000 cps, the presence of a diluent for the epoxy resin becomes increasingly more preferred. More importantly, however, in order to insure that a stable dispersion is prepared, particularly with higher molecular weight epoxy resins, the use of a non-ionic surfactant of the polyether type is particularly preferred. These surfactants are well known and will not be described further. In general, the amount of such surfactants should not exceed about 10% by weight, based on the total weight of the epoxy resin and the curing agent.

The co-solvent/diluent has been described above and is more particularly described in U.S. Pat. No. 4,246,148 at columns 12 thru 14 which are incorporated by reference herein.

When the epoxy resin and the curing agent are mixed, the resulting coating composition exhibits a pot life at room temperature of from about 2 hours to about 12 hours, and preferably from about 3 hours to about 8 hours.

The pot life of the coating composition is herein defined to be the elapsed time from mixing the components together until the resulting composition is no longer suitable, with normal thinning, for application by spray, brush, or roll coating techniques to a substrate. The suitability for application by common techniques can be expressed in terms of the viscosity of the coating composition. Thus, the pot life of unpigmented coatings can be characterized as the elapsed time from mixing the two components to the time when the viscosity of the coating compositions drops below $A_1$ or increases above Z as determined by the Gardner-Holdt method. For pigmented coatings, useful applications viscosities are between 50 and 140 Kreb Units (K.U.) as determined with a Stormer viscometer. Typically the viscosity of the coating composition will increase until the microemulsion either breaks, in which case the epoxy resin settles into a separate layer accompanied by a substantial reduction in viscosity, or until crosslinking reactions take place accompanied by a substantial increase in viscosity.

Coatings based on the compositions described herein can be formulated into easily handled two-package systems which blend together as easily as their solvent based counterparts. Applications properties are excellent. Application by brush, spray and roller-coating are remarkably free of bubbling and other film imperfections.

The coating systems described herein also exhibit good adhesion to such widely varied substrates as galvanized metal, cold rolled steel (untreated and phosphate treated), hot rolled steel, and aluminum. Flash rusting is not a problem over untreated steel and, therefore, there is no need for special additives as in some water reducible epoxy systems. Adhesion is also excellent to three and four-year old alkyd and epoxy ester enamel films. Such systems may therefore be employed for repaint purposes in food processing plants and dairies and can also be used as adhesive compositions per se.

As pointed out above the major advantage of the coating compositions of the instant invention is that they are useful in preparing solvent and chemically resistant coating compositions from aqueous based systems. These systems do not exhibit the traditional solvent related problems shown by solvent based systems and accordingly are preferred in end-use applications where nonpolluting or nonflammable coatings systems are necessary. In addition, the cured state properties of compounds made from the curing agents disclosed herein are substantially equivalent to the properties of compounds prepared from prior art solvent based systems.

The invention is additionally illustrated in connection with the following Examples which are to be considered as illustrative of the present invention. It should be understood, however, that the invention is not limited to the specific details of the Examples. All parts and percentages in the Examples as well as in the remainder of the specification are by weight unless otherwise specified.

In the following examples the following products are employed:

A. Epi Rez 510 is diglycidyl ether of Bisphenol A having weight per epoxide of approximately 190 and a representive Gardner Holt 25° C. viscosity of 12,000 cps. The material is available from the Celanese Corporation.

B. Epi Rez 502 is a diglycidyl ether of a polypropylene glycol, said glycol having an average molecular of weight of about 400. Epi Rez 502 has a representative viscosity of 85 cps. and an average weight per epoxide of 312. The material is available from the Celanese Corporation.

C. ETPPI is ethyltriphenylphosphonium iodide.

D. TETA is triethylene tetramine.

E. CGE is cresol glycidyl ether which has an average weight per epoxide of 193.

F. Ektasolve EP is the monopropyl ether of ethylene glycol and is available from the Eastman Kodak Corporation.

G. Propasol P is the monopropyl ether of propylene glycol and is available from the Union Carbide Corporation.

EXAMPLES

EXAMPLE 1

Into a reactor equipped with a mechanical agitator, sampling tube, condensor and gas inlet tube were added 787 parts of Epi Rez 510, 394 parts of Epi Rez 502 and 419 parts of Bisphenol A. A nitrogen sparge was begun and the mixture was heated to 205° F. over a 15 minute period at which time 0.21 parts of ETPPI were added to the mixture. The mixture was then heated to 410° F. over approximately a 1 hour period and held at a temperature of about 350° F. for 1 hour and 45 minutes. At this point 1,067 parts of toluene were added to the reactor. The resulting product exhibited a solids content of 60.7, a weight per epoxide of 891 and a Gardner Holdt 25° C. viscosity of P. The Gardner color of the reaction mixture was 2–3.

EXAMPLES 2–8

Utilizing essentially the same procedure as specified in Example 1, the examples were prepared described in Table I. The column headed Epi Rez 510 indicated the amount of Epi Rez 510 added. The column headed Epi Rez 502 indicates the amount of Epi Rez 502 employed in the reaction. The columns headed "Bisphenol A" indicates treatment of Bisphenol A employed in the reaction. The column headed "Toluene" indicates the weight of those products added after the reaction was completed. The solids content is the solids content by weight of the completed material. The column headed "VIS" the Gardner Holdt 25° C. viscosity of the final product. The column headed "WPE" indicates the weight per epoxide of the final product. The column headed "Color" indicated the Gardner color of the product.

EXAMPLE 9

Into a reactor equipped as in Example 1 were added 414 parts of triethylene tetramine. A nitrogen sparge was begun and the material was heated at 240° F. at which point 2000 parts of the material prepared in Example 1 were added to the reactor over an hour and 15 minute period with temperatures ranging from 240° to 215° F. The reaction mixture was then held at temperatures ranging from 215° to 225° F. for approximately one hour at which time a vacuum was applied and the material was heated to a temperature of 260° F. Vacuum application was continued for approximately 2 hours and 15 minutes at which point the temperature had reached 450° F. and the vacuum was at 2 Torr. The material was allowed to cool to 350° F. and 535 parts of Ektasolve EP were added to the reactor. The material was cooled to 260° F. and 263 parts of cresol glycidyl ether were added over a one half hour period with the temperature ranging between 260° F. and 240° F. The material was then held for approximately one half hour at a temperature ranging from 240° to 225° F. and 535 parts of methylisobutyl ketone and 50.5 parts of acetic acid were added to the reactor. The resulting product exhibited a Gardner Holdt 25° C. viscosity of $Z_4$, a solids content of 59.9, a Gardner color of 8 and a solids acid value of 37.1.

EXAMPLES 10–16

Utilizing essentially the same procedures as specified in Example 9 the examples set forth in Table II were prepared as Examples 10–16. In Table II, the column headed "TETA" indicates the amount of triethylene tetramine added. The column headed "Example #" indicates the specific example number of the base resin as prepared above which was added to the reactor. The column headed "Example Amt" sets forth the amount of that example which was added. The column headed "CGE" sets forth the amount of cresol glycidyl ether which was added to the reactor. The columns headed "Ektasolve EP," "MIBK" and "Acetic Acid" indicate the amount by weight of each of those products which was added. The columns headed "Solids", "VIS" and "Color" have the same meanings as specified with respect to Table 1. The column headed "A.V." indicated the solids acid value of the reaction product.

The materials prepared above were evaluated by preparing a coating composition based upon WJ55-3520 which is water dispersed version of Epi Rez 520 a diglycidyl ether of bisphenol A having a weight per epoxide in its undispersed form of approximately 490. Mixed with the water dispersed epoxy resin is a stoichimeteric equivalent amount of each of the products prepared in Examples 10 thru 16. After the materials were mixed they were diluted to a viscosity of 100 Krebs units with water and the coating was applied to a steel plate to a film thickness of approximately 3 mils. The coating cured by at room temperature and was evaluated as indicated in Table 3.

TABLE I

| Example | ER 510 | ER 502 | Bisphenol A | Toluene | Solids | VIS | WPE | Color |
|---|---|---|---|---|---|---|---|---|
| 2 | 528 | 880 | 492 | 1066 | 60.3 | $A_3-A_4$ | 398 | 3-4 |
| 3 | 761 | 609 | 231 | 1066 | 60.1 | $A_1-A_2$ | 395 | 3 |
| 4 | 760 | 380 | 460 | 1066 | 60.8 | V | 1284 | 2 |
| 5 | 898 | 449 | 253 | 1067 | 62.7 | $A-A_1$ | 398 | 2 |
| 6 | 463 | 771 | 366 | 1066 | 62.1 | E-F | 919 | 4 |
| 7 | 644 | 515 | 441 | 1066 | 60.5 | R-S | 1277 | 4 |
| 8 | 2038 | 430 | 764 | 1385 | 71.3 | Y-Z | 586 | 1 |

TABLE II

| Ex. | TETA | Example # | Example Amount | CGE | EKTASOLVE EP | MIBK | Acetic Acid | Solids | VIS | A.V. | Color |
|---|---|---|---|---|---|---|---|---|---|---|---|
| 10 | 794 | 2 | 1723 | 504 | 618 | 618 | 58.2 | 60.3 | X-Y | 49.0 | 9-10 |
| 11 | 786 | 3 | 1700 | 359 | 609 | 609 | 57.4 | 60.4 | Y | 40.4 | 8-9 |
| 12 | 288 | 4 | 2000 | 183 | 491 | 491 | 46.3 | 60.2 | $Z_5-Z_6$ | 40.8 | 9 |
| 13 | 788 | 5 | 1700 | 500 | 613 | 613 | 57.8 | 61.0 | $Z_1$ | 36.3 | 8 |
| 14 | 411 | 6 | 2000 | 261 | 544 | 544 | 51.0 | 61.0 | $Z_2-Z_3$ | 47.1 | 10-11 |
| 15 | 288 | 7 | 2000 | 183 | 489 | 489 | 46.1 | 58.7 | $Z_4$ | 42.8 | 10 |
| 16 | 594 | 8 | 1700 | 323 | 583 | 583 | 55 | 61.0 | $Z_4$ | 36.8 | 6-7 |

TABLE III

| | 1/9 | 2/10 | 3/11 | 4/12 | 5/13 | 6/14 | 7/15 |
|---|---|---|---|---|---|---|---|
| 1 wk Pencil Hardness | HB | F | HB | HB | HB | HB | F |
| MEK Rubs | 55 | 65 | 54 | 51 | 95 | 73 | 45 |
| $HNO_3$ | Hazy 8D > 6B | Very Hazy >6B | Hazy >6B | Hazy >6B | Hazy 8VD > 6B | Sl. Hazy >6B | Sl. Hazy 8VD > 6B |
| Reverse Impact (in/lb) | 120 | 120 | 160 | 100 | 120 | 140 | 140 |

TABLE IV

| Example | 510/502 Ratio | WPE | End Cap | Glycidyl Ether | Co Solvent | Hardness | Mek Res | $HNO_3$ Res |
|---|---|---|---|---|---|---|---|---|
| 17 | 1.25 | 900 | CGE | PP | Toluene | H | 75 | Blisters |
| 18 | 1.25 | 900 | CGE | PP | MIBK | H | 50 | Blisters |
| 19 | 1.25 | 900 | CGE | PP | Toluene | H | 30 | Blisters |
| 20 | 2.0 | 400 | CGE | EP | MIBK | HB | 95 | Blisters |
| 21 | 4.7 | 600 | BGE | EP | MIBK | F-H | 96 | 8MD |
| 22 | 4.7 | 600 | CGE | EP | MIBK | H-2H | 165 | None |

EXAMPLE 17

Example 1/9 was repeated except that the weight ratio of the Epi Rez 510 to Epi Rez 502 was 1.25 and the liquid advanced, reaction product of Epi Rez 501, Epi Rez 502 was advanced with Bisphenol A to a product which exhibited a weight per epoxide of 900. The end capping agent was cresol glycidyl ether. The amine was triethylene tetramine. The liquid used as a solvent was Propasol P, which is a monopropylether of propylene glycol and the co-solvent was toluene. The resulting product was mixed with a stoichimeteric equivalent amount of the Epi Rez 520 aqueous dispersion described in Example 16, applied to coal rolled steel panels and cured as specified in example 16. The resulting coating exhibited a pencil hardness of H and resisted 75 MEK rubs. The coating blistered when treated with a drop of nitric acid.

EXAMPLE 18-22

Examples 18-22 were prepared in a fashion similar to Example 17. The column headed 510/502 Ratio indicate the weight ratio of the Epi Rez 510 to Epi Rez 502 used in the reaction. The column headed WPE is indicative of the amount of bisphenol A added to produce the specified weight per epoxide. The end capping agent in all cases except for Example 21, was cresol glycidyl ether. Example 21 was end capped with BGE (butylglycidyl ether). The glycol ether co-solvent was either Ektasolve EP (ethylene glycol monopropyl ether) or Propasol P (propylene glycol monopropyl ether). The results are shown in Table IV.

What is claimed is:

1. An epoxy resin curing agent comprising a volatile acid salt of the reaction product of (a) an epoxy resin which comprises an essentially linear diepoxide prepared by reacting a diglycidyl ether of a dihydric phenol, a diglycidyl ether of an aliphatic dihydroxy polyether and a dihydric phenol, with (b) a primary containing polyamine, followed by reaction with (c) a monoepoxide, or monocarboxylic acid, wherein substantially all of the epoxy groups in said epoxy resin are reacted with the polyamine and wherein substantially at least all of the unreacted primary amine groups in the polyamine/epoxide reaction product are further reacted with the monoepoxide or the monocarboxylic acid.

2. The curing agent of claim 1 wherein the dihydric phenol is bisphenol A.

3. The curing agent of claim 1 wherein the aliphatic dihydroxy polyether is based upon $C_1-C_4$ polyalkylene oxides or mixtures thereof having molecular weights in the range of about 150 to 1500.

4. The curing agent of claim 1 wherein the polyamine is a polyalkylene polyamine.

5. This curing agent of claim 1 wherein the monoepoxide is an aromatic monoepoxide.

6. The curing agent of claim 1 wherein the volatile acid is selected from the gourp consisting of formic acid, acetic acid and propionic acid.

7. The curing agent of claim 1 wherein the epoxy resin has a weight per epoxide in the range of about 400 to about 1300.

8. The curing agent of claim 1 wherein the epoxy resin is prepared by mixing a diglycidyl ether of dihydric phenol, a diglycidyl ether of an aliphatic dihydroxy polyether and unreacted dihydric phenol and co-reacting to form a liquid advanced essentially linear diepoxide.

9. An epoxy resin curing agent comprising a volatile acid salt of the reaction product of (a) an epoxy resin which comprises an essentially linear diepoxide prepared by reacting a diglycidyl ether of a dihydric phenol, a diglycidyl ether of an aliphatic dihydroxy polyether and a dihydric phenol, with (b) a primary amino group containing polyamine, followed by reaction with (c) a monoepoxide or monocarboxylic acid wherein substantially all of the epoxide groups in said epoxy resin are reacted with the polyamine and wherein substantially at least all of the unreacted primary amine groups in the polyamine/epoxide reaction product are further reacted with the monoepoxide or the monocarboxylic acid and wherein the dihydric phenol is selected from resorcinol, hydroquinone, Bisphenol-A and p,p'-dihydroxydiphenyl ethane, the aliphatic dihydroxy polyether is based upon $C_1$–$C_4$ polyalkylene oxides, or a mixture thereof, having molecular weights in the range of about 150 to 1500, the polyamine is a polyalkylene polyamine, the monoepoxide is an aromatic monoepoxide and the volatile acid is selected from formic acid, acetic acid and propionic acid.

10. The curing agent of claims 1 or 9 wherein the diglycidyl ether of the aliphatic dihydroxypolyether is based upon polyalklene oxides and has a weight per epoxide in range of about 300 to about 325.

11. The curing agent of claims 1 or 9 wherein the polyamine has the formula:

wherein n is 0 to 4 and R is an alkylene or arylene group containing 2 to 8 carbon atoms.

12. The curing agent of claims 1 or 9 wherein the amine is selected from diethylenetriamine, triethylenetetramine, tetraethylenepentamine and meta-xylylene diamine.

13. The curing agent of claims 1 or 9 wherein the monoepoxide is cresyl monoglycidyl ether or cashew nut oil monoepoxide.

14. The curing agent of claims 1 or 9 wherein the monocarboxylic acid is a $C_4$–$C_{22}$ unsaturated monocarboxylic acid or a $C_5$–$C_{11}$ saturated monocarboxylic acid.

15. The curing agent of claims 1 or 9 wherein the monocarboxylic acid is selected from pelaragonic acid and drying oil based fatty acids.

16. An ambient temperature curable, coating composition comprising an aqueous solution or dispersion of the composition of claims 1 or 9 in admixture with an aqueous solution or dispersion of a polyepoxide.

17. The composition of claim 16 wherein the polyepoxide has a weight per epoxide of no greater than about 1000.

18. The composition of claim 17 wherein the polyepoxide has a weight per epoxide of about 180 to about 700.

19. The composition of claim 16 wherein the ratio of the epoxy groups in the polyepoxide to reactive amine hydrogen groups in the curing agent is in the range of 0.5 to 1.0 to about 1.5 to 1.0.

20. The composition of claim 16 in admixture with a co-solvent.

21. The composition of claim 20 wherein the co-solvent is an oxygenated solvent.

22. The composition of claim 21 wherein the co-solvent is an alkyl ether of ethylene or propylene glycol.

* * * * *